United States Patent [19]
Yoshioka et al.

[11] Patent Number: 5,088,900
[45] Date of Patent: Feb. 18, 1992

[54] MOTOR-OPERATED PUMP HAVING A PROJECTION FOR PROTECTING A COMMUTATOR

[75] Inventors: Hiroshi Yoshioka; Shingo Iwai, both of Hiroshima, Japan

[73] Assignee: Mitsubishi Denki K.K., Tokyo, Japan

[21] Appl. No.: 528,505

[22] Filed: May 25, 1990

[30] Foreign Application Priority Data

May 31, 1989 [JP] Japan .................... 1-135857

[51] Int. Cl.$^5$ ............................. F04D 13/08
[52] U.S. Cl. ................. 417/366; 417/423.7; 310/90
[58] Field of Search ............... 417/366, 423.3, 423.7, 417/423.12, 423.14, 424.1, 902; 310/85, 90

[56] References Cited

U.S. PATENT DOCUMENTS

| | | |
|---|---|---|
| 1,592,326 | 7/1926 | Bastian . |
| 3,495,115 | 2/1970 | Lucas . |
| 3,676,025 | 7/1972 | Shultz et al. . |
| 4,447,192 | 5/1984 | Tuckey ............... 417/366 |
| 4,800,309 | 1/1989 | Lakin ................. 310/90 |
| 4,887,916 | 12/1989 | Adam et al. ......... 310/90 X |
| 4,948,346 | 8/1990 | Tuckey ............. 417/423.12 |

FOREIGN PATENT DOCUMENTS

| | | |
|---|---|---|
| 348448 | 1/1928 | Belgium . |
| 2165573 | 8/1973 | France . |
| 63-272994 | 11/1988 | Japan . |

OTHER PUBLICATIONS

Patent Abstracts of Japan, vol. 13, No. 76 (M-800)(3424), Feb. 21, 1989.
JP-A 63-27994 (Nippon Denso Co., Ltd.), Nov. 10, 1988.

Primary Examiner—Richard A. Bertsch
Assistant Examiner—David L. Cavanaugh
Attorney, Agent, or Firm—Sughrue, Mion, Zinn Macpeak & Seas

[57] ABSTRACT

A motor-operated pump of the in-tank type including a motor for driving the pump, the motor having a commutator; a bracket covering one end of the motor disposed adjacent to the commutator; a brush held against the commutator through a through hole formed in the bracket; and a bearing for supporting a shaft of the motor. An annular projection is formed on a central portion of a surface of bracket disposed in opposed relation to the commutator, and the annular projection is formed integrally with the bracket. Alternatively, an annular projection is formed on a central portion of the commutator disposed in opposed relation to the bearing, and the annular projection is made of an electrically insulating material constituting the commutator, and is formed integrally with the commutator.

4 Claims, 3 Drawing Sheets

FIG. 1
FIG. 2
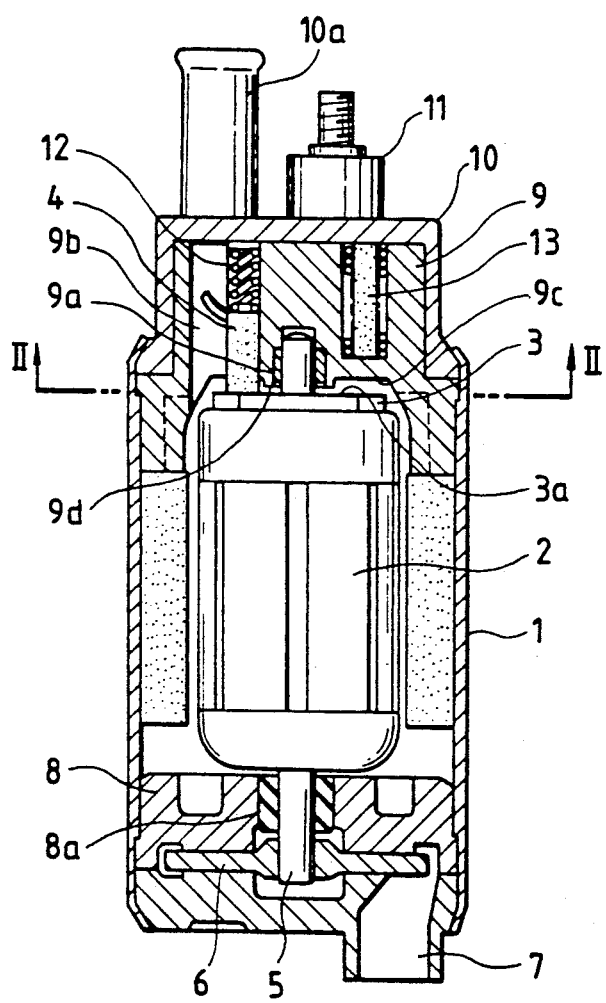
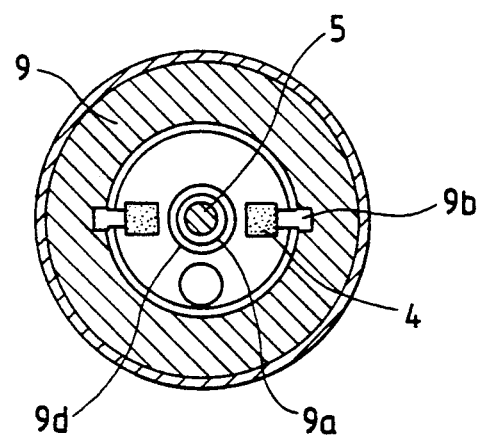

MOTOR-OPERATED PUMP HAVING A PROJECTION FOR PROTECTING A COMMUTATOR

BACKGROUND OF THE INVENTION

1. Field of the Invention

This invention relates to a motor-operated pump of the in-tank type, and more particularly to a motor-operated pump of the in-tank type adapted to be sunk in a liquid fuel tank of a vehicle such as an automobile.

2. Description of the Related Art

FIG. 6 is a cross-sectional view of a conventional motor-operated pump of the in-tank type as disclosed in Japanese Laid-Open (Kokai) Patent Application No. 272994/88. In this Figure, reference numeral 1 denotes a motor serving as a pump drive source, reference numeral 2 denotes a rotor of the motor 1, reference numeral 3 denotes a commutator of the rotor 2, reference numeral 4 denotes a brush held in contact with the commutator 3 so as to supply electric power to the rotor 2, reference numeral 5 denotes a shaft of the rotor 2, reference numeral 6 denotes an impeller connected to the shaft 5 and forming the pump, reference numeral 7 denotes an intake port of the pump, reference numeral 8 denotes a pump casing, reference numeral 9 denotes a bracket of the motor 1, reference numeral 10 denotes a cover-out, reference numeral 10a denotes a discharge port of the pump, reference numeral 11 denotes a terminal mounted on the cover-out 10 so as to be supplied with electric power from the exterior, reference numeral 12 denotes a brush spring for urging the brush 4 against the commutator 3, and reference numeral 13 denotes a noise prevention device for preventing electrical noises. Bearings 8a and 9a are mounted on the pump casing 8 and the bracket 9, respectively. The bracket 9 has a through hole 9b receiving the brush 4.

The conventional motor-operated pump of the in-tank type is constructed as described above, and when electric power is supplied to the terminal 11, the electric power is supplied to the rotor 2 via the noise prevention device 13, the brush 4 and the commutator 3. As a result, the rotor 2 is driven, and the impeller 6 connected to the rotor 2 is rotated, and fuel is drawn into the intake port 7 by the rotating impeller 7, and then is fed to an engine or the like (not shown) via the discharge port 10a.

In the above-described conventional motor-operated pump of the in-tank type, the side 3a of the commutator 3 held in sliding contact with the brush 4 are disposed in opposed relation to the bracket 9 and the bearing 9a. Therefore, when the axially-movable rotor 2 is moved due to vibrations or the like, the brush-sliding contact surface 3a of the commutator 3 is brought into contact with a confronting surface 9c of the bracket 9 which results in a problem that the durability of the pump is adversely affected. Also, the brush-sliding contact surface 3a is brought into contact with the bearing 9a, which results in a problem that the performance of the pump is markedly lowered.

SUMMARY OF THE INVENTION

The present invention has been made in order to overcome the above problems, and an object of the invention is to provide a motor-operated pump of the in-tank type in which stable performance of the pump is achieved by avoiding contact between opposed surfaces of a bracket and a commutator, thereby improving the reliability of the pump.

According to the present invention, there is provided a motor-operated pump of the in-tank type in which an annular projection is formed on a central portion of a surface of a bracket disposed in opposed relation to a commutator, and the annular projection is formed integrally with the bracket.

According to the invention, there is provided a motor-operated pump of the in-tank type in which an annular projection is made of an electrically insulating material constituting a commutator, and is formed integrally on a central portion of a brush-sliding contact surface of the commutator.

According to the first aspect, even if a rotor is moved due to vibrations, the annular projection is brought into contact with that portion of the commutator other than the brush-sliding contact surface of the commutator, thereby protecting the sliding contact surface. Further, the bearing is prevented from making contact with an electrical conductor portion of the commutator.

According to the second aspect even if a rotor is moved due to vibrations, the annular projection is brought into contact with the bracket, thereby protecting the sliding contact surface. Further, the bearing is prevented from making contact with the sliding contact surface of the commutator.

BRIEF DESCRIPTION OF THE DRAWINGS

In the accompanying drawings:

FIG. 1 is a vertical cross-sectional view of one example of a first embodiment of the invention;

FIG. 2 is a cross-sectional view taken along the line II—II of FIG. 1;

DETAILED DESCRIPTION OF THE PREFERRED EMBODIMENTS

Figure 6:
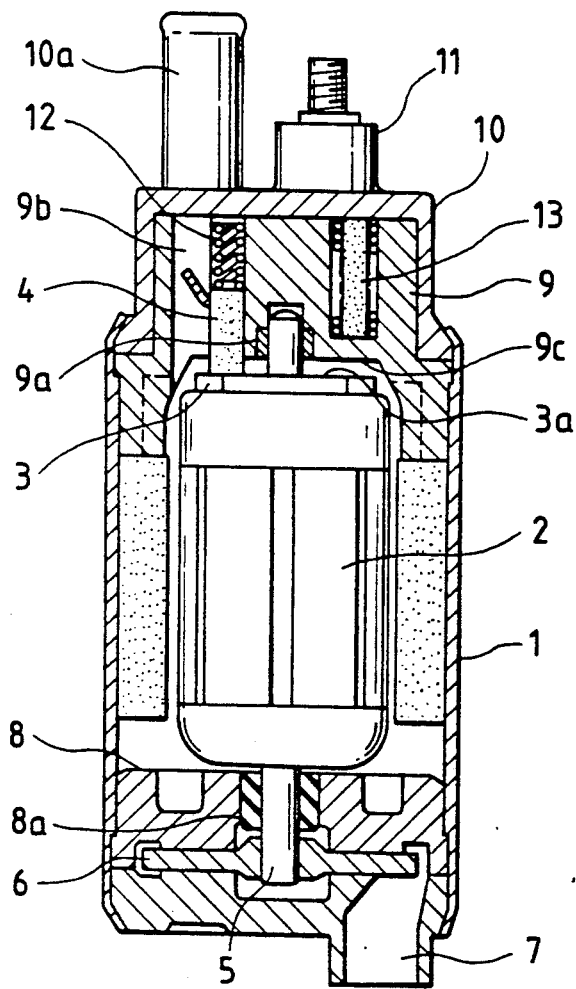
FIG. 6 is a vertical cross-sectional view of a conventional motor-operated pump of the in-tank type.

FIGS. 1 and 2 show one example of a first aspect of the invention. In FIGS. 1, 2 and 6, identical reference numerals denotes the same parts, respectively. An annular projection 9d is formed integrally with bracket 9.

A fuel feed operation in the construction of this embodiment is the same as that described with reference to FIG. 6, and therefore explanation thereof is omitted here. However, the annular projection 9d is integrally formed on a central portion of a surface of the bracket 9 facing a commutator. Therefore, even when vibrations are imparted to the pump mounted on a vehicle or the like, the commutator-facing surface 9c of the bracket 9 will not be brought into contact with a brush-sliding contact surface 3a, and only the annular projection 9d is brought into contact with that portion of the commutator 3 other than the brush-sliding contact surface 3a.

Further, an electrically-conductive portion of the commutator 3 will not be brought into contact with a bearing 9a, thus preventing an electrical conductor member of the commutator 3 from being short-circuited via the bearing 9a.

Figure 3:
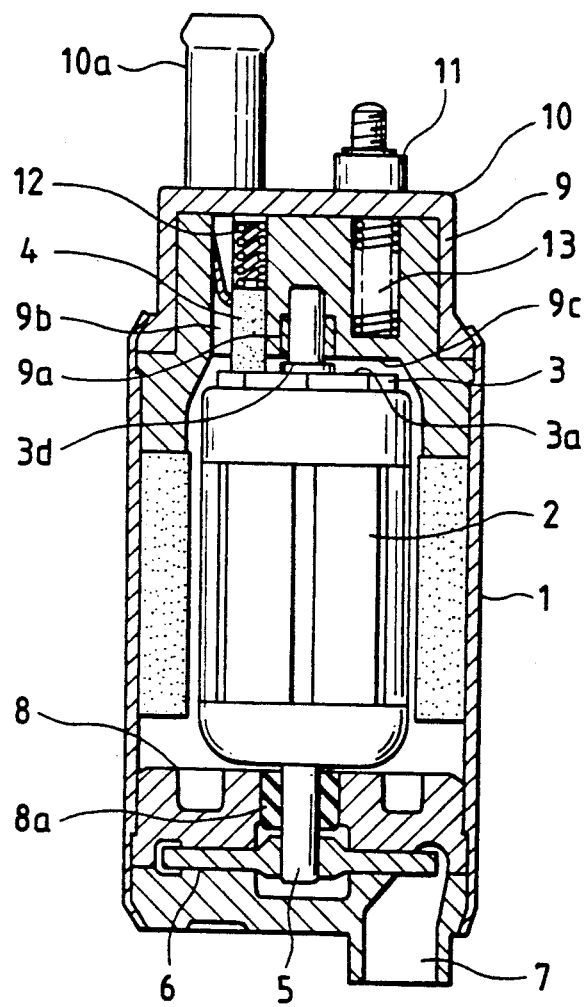
FIG. 3 is a vertical cross-sectional view of one example of a second embodiment of the invention.
Figure 4:
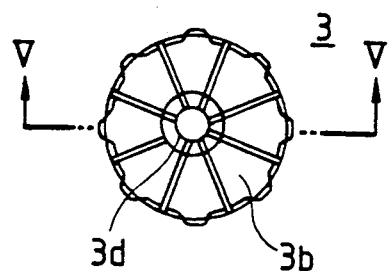
FIG. 4 is a plan view of a commutator in FIG. 3.
Figure 5:
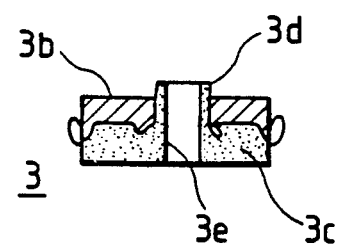
FIG. 5 is a cross-sectional view taken along the line V—V of FIG. 4.

FIGS. 3 to 5 show one example of a second aspect of the invention, and in FIGS. 3 to 6, identical reference numerals denotes the same parts, respectively.

A commutator 3 comprises a plurality of generally-fan shaped electrical conductor members 3b in sliding contact with a brush. Thus, the plurality of conductor members 3b constitute the commutator 3. An electrically insulating member 3c serves as a base member for the commutator 3, and holds the conductor members 3b. The commutator 3 has a central hole 3e through which a shaft 5 of a rotor 2 extends. An annular projection 3d is formed integrally with the insulating member 3c, and disposed in surrounding relation to the central hole 3e.

A fuel feed operation in the construction of this embodiment is the same as that described with reference to FIG. 6, and therefore explanation thereof is omitted here. However, the annular projection 3d of an electrically insulating material is integrally formed on a central portion of a surface 3a of the commutator 3 disposed in sliding contact with a brush 4. Therefore, even when vibrations are imparted to the pump mounted on a vehicle or the like, the brush-sliding contact surface 3a of the commutator 3 will not be brought into contact with a bracket 9, and only the annular projection 3d is brought into contact therewith.

As described above, according to the first aspect of the invention, the annular projection is formed integrally on the central portion of the commutator-facing surface of the bracket, and therefore the surface (the conductor portion) of the commutator in sliding contact with the brush can be protected, and a mechanical load due to the contact between the commutator and the bracket can be kept to a minimum. Further, the conductor portion of the commutator will not be brought into contact with the bearing, thus preventing the conductor portion of the commutator from being short-circuited via the bearing. This construction provides advantages such as low costs and an enhanced reliability.

According to the second aspect of the invention, the annular projection of an electrically insulating material is formed integrally on the central portion of the brush-sliding contact surface of the commutator, and therefore the brush-sliding contact surface (the conductor portion) of the commutator can be protected, and a mechanical load due to the contact between the commutator and the brush can be kept to a minimum. Further, if the bearing should be moved toward the commutator, the commutator is prevented from being short-circuited via the bearing. This construction provides advantages such as low costs and an enhanced reliability.

We claim:

1. A motor-operated pump of the in-tank type comprising a motor for driving the pump, said motor having a commutator; a bracket covering one end of said motor disposed adjacent to said commutator; a brush held against said commutator through a through hole formed in said bracket; and a bearing for supporting a shaft of said motor; wherein an annular projection is formed on a center portion of a surface of said bracket disposed in opposed relation to said commutator, is formed integrally with said bracket, and prevents contact of said commutator with said bracket.

2. A motor-operated pump of the in-tank type comprising a motor for driving the pump, said motor having a commutator; a bracket covering one end of said motor disposed adjacent to said commutator; a brush held against said commutator through a through hole formed in said bracket; and a bearing for supporting a shaft of said motor; wherein an annular projection is formed on a central portion of said commutator disposed in opposed relation to said bearing, and said annular projection is made of an electrically insulating material constituting said commutator, and is formed integrally with said commutator.

3. A motor-operated pump as recited in claim 2, wherein said annular projection prevents contact of said commutator with said bracket.

4. A motor-operated pump as recited in claim 2, wherein the commutator comprises a plurality of conductor members and an insulating member made of the electrically insulating material, said annular projection is formed integrally with the insulating member, and the conductor members are formed on the insulating member, whereby said annular projection prevents contact of the conductor members with said bracket which would otherwise occur.

* * * * *